United States Patent
Osborne

(10) Patent No.: US 12,244,497 B2
(45) Date of Patent: *Mar. 4, 2025

(54) DYNAMIC SEGMENT ROUTING MAPPING SERVER FOR A MULTIPROTOCOL LABEL SWITCHING NETWORK

(71) Applicant: Level 3 Communications, LLC, Broomfield, CO (US)

(72) Inventor: Eric Osborne, Sutton, MA (US)

(73) Assignee: Level 3 Communications, LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/243,814

(22) Filed: Sep. 8, 2023

(65) Prior Publication Data
US 2023/0421496 A1 Dec. 28, 2023

Related U.S. Application Data

(63) Continuation of application No. 17/719,781, filed on Apr. 13, 2022, now Pat. No. 11,757,776, which is a continuation of application No. 17/021,703, filed on Sep. 15, 2020, now Pat. No. 11,310,157, which is a continuation of application No. 16/054,594, filed on Aug. 3, 2018, now Pat. No. 10,785,153.

(60) Provisional application No. 62/545,266, filed on Aug. 14, 2017.

(51) Int. Cl.
*H04L 45/74* (2022.01)
*H04L 45/50* (2022.01)
*H04L 61/5007* (2022.01)
*H04L 65/1033* (2022.01)
*H04L 65/65* (2022.01)

(52) U.S. Cl.
CPC .............. *H04L 45/74* (2013.01); *H04L 45/50* (2013.01); *H04L 61/5007* (2022.05); *H04L 65/104* (2013.01); *H04L 65/65* (2022.05)

(58) Field of Classification Search
None
See application file for complete search history.

(56) References Cited

U.S. PATENT DOCUMENTS

| | | | |
|---|---|---|---|
| 7,620,055 B1 * | 11/2009 | Chandran | H04L 45/50 725/111 |
| 7,974,201 B1 * | 7/2011 | Daruwalla | H04L 45/00 370/409 |
| 9,369,347 B2 | 6/2016 | Filsfils | |
| 10,263,881 B2 | 4/2019 | Psenak | |
| 10,491,720 B2 * | 11/2019 | Brissette | H04L 45/033 |
| 10,785,153 B2 | 9/2020 | Osborne | |

(Continued)

*Primary Examiner* — Phirin Sam

(57) ABSTRACT

A dynamic SRMS (DSRMS) in a MPLS network generates unique segment identifiers for nodes of the network lacking segment identifiers (SIDs). The DSRMS receives network information from other nodes of the network that may include, for example, Internal Gateway Protocol (IGP) routing information, advertised prefix values for the nodes, and label values used in MPLS routing. The DSRMS analyzes the information and identifies nodes of the network that are not associated with a SID. For each identified node, the DSRMS generates a unique SID and then announces the SID to other nodes within the network. Generating the unique SID may include executing a hashing function using the IP address of the identified node as an input.

8 Claims, 5 Drawing Sheets

(56) References Cited

U.S. PATENT DOCUMENTS

| | | | |
|---|---|---|---|
| 11,310,157 B2* | 4/2022 | Osborne | H04L 65/104 |
| 11,757,776 B2* | 9/2023 | Osborne | H04L 65/104 |
| | | | 370/351 |
| 2012/0082163 A1 | 4/2012 | Rothenberg | |
| 2012/0177054 A1 | 7/2012 | Pati | |
| 2013/0163594 A1 | 6/2013 | Sharma | |
| 2014/0269724 A1* | 9/2014 | Mehler | H04L 41/0895 |
| | | | 370/392 |
| 2014/0369356 A1* | 12/2014 | Bryant | H04L 45/745 |
| | | | 370/392 |
| 2015/0016304 A1 | 1/2015 | Unbehagen | |
| 2017/0093611 A1 | 3/2017 | Arora | |
| 2017/0195135 A1 | 7/2017 | Singh | |
| 2017/0346718 A1* | 11/2017 | Psenak | H04L 45/02 |
| 2018/0006995 A1 | 1/2018 | Bickhart | |
| 2018/0034648 A1* | 2/2018 | Nagarajan | H04L 69/14 |
| 2018/0077051 A1* | 3/2018 | Nainar | H04L 45/745 |
| 2018/0205641 A1 | 7/2018 | Pignataro | |
| 2018/0287934 A1* | 10/2018 | Wang | H04L 12/44 |
| 2018/0287935 A1* | 10/2018 | Wang | H04L 12/4625 |
| 2018/0287990 A1* | 10/2018 | Bickhart | H04L 12/4625 |
| 2018/0295054 A1* | 10/2018 | Chunduri | H04L 45/50 |
| 2018/0309596 A1 | 10/2018 | Brissette | |
| 2018/0351882 A1 | 12/2018 | Jeganathan | |
| 2019/0013964 A1 | 1/2019 | Wignands | |
| 2019/0020738 A1* | 1/2019 | Paul | H04L 45/58 |
| 2019/0058657 A1* | 2/2019 | Chunduri | H04L 45/50 |
| 2019/0349303 A1* | 11/2019 | Previdi | H04L 69/166 |
| 2019/0386848 A1* | 12/2019 | Wang | H04L 12/4625 |
| 2020/0044967 A1 | 2/2020 | Osborne | |
| 2020/0099775 A1* | 3/2020 | Brissette | H04L 69/22 |
| 2020/0412650 A1 | 12/2020 | Osborne | |
| 2022/0166860 A1* | 5/2022 | Brissette | H04L 69/324 |
| 2022/0239593 A1 | 7/2022 | Osborne | |

* cited by examiner

DYNAMIC SEGMENT ROUTING MAPPING SERVER FOR A MULTIPROTOCOL LABEL SWITCHING NETWORK

TECHNICAL FIELD

Embodiments of the present invention generally relate to systems and methods for implementing a telecommunications network and more specifically for instantiating a dynamic segment routing mapping server in a Multiprotocol Label Switching network that generates unique segment identifiers for nodes of the network that otherwise lack such identifiers.

BACKGROUND

Telecommunication networks provide for the transmission of information across some distance through terrestrial, wireless or satellite communication networks, and often through combinations of such networks. Such communications may involve voice, data, or multimedia (e.g., video or streaming video) information, among others. In some instances, telecommunication networks may use Multiprotocol Label Switching (MPLS) to route communication packets through the network. MPLS networks utilize labels rather than long network addresses to transmit packets from device to device (or network node to node).

In one particular MPLS scheme, any label may be advertised and used between nodes to transmit the packets between the nodes. In another MPLS scheme known as segment routing, each node within the network is assigned or given a unique label, referred to as a prefix segment identifier (SID). To facilitate routing, each prefix SID within a network is announced to the other nodes within the network. A packet may then be routed to a particular node within the network by adding or "pushing" the corresponding prefix SID onto a routing stack of the packet, and routing the packet through the network to reach the node corresponding to the prefix SID. Such routing may be performed according to various routing strategies including shortest path and equal cost multipath (ECMP) routing. When a given packet reaches the node corresponding to the prefix SID, the node may "pop" the prefix SID from the routing stack and, if another label is present, forward the packet in accordance with the next label. Alternatively, if no additional labels are present, the node may consume or otherwise route the packet to an autonomous system (AS) or other network associated with the node.

In addition to routing based on prefix SIDs, segment routing can include routing based on adjacency SIDs. An adjacency SID is locally unique to a given node and identifies a specific link between the node and a neighboring node. A given node having multiple links to other nodes will therefore have multiple adjacency SIDs, each of which corresponds to one of the links. When routing a packet, a prefix SID may be followed by an adjacency SID in the routing stack to first route a packet to the node corresponding to the prefix SID and then to subsequently have the node transmit the packet along the link identified by the adjacency SID.

It is with these observations in mind, among others, that aspects of the present disclosure were conceived.

SUMMARY

In one aspect of the present disclosure, a network routing method is provided. The method includes receiving Internet Protocol (IP) addresses at a computing device from components of a Multiprotocol Label Switching (MPLS) network, a subset of the IP addresses being unassociated with a segment identifier (SID) for routing communication packets in the MPLS network. The method further includes analyzing the subset of IP addresses to identify a router identifier (RID) IP address within the subset of IP addresses, the RID IP address corresponding to a node of the MPLS network that may be included in a Label-Switched Path (LSP) of the MPLS network. A unique SID is then generated for the RID IP address. The unique SID and corresponding RID IP address is then announced as a matched pair for segment routing in the MPLS network using a signaling protocol. For example, in certain implementations, the signaling protocol may be Interior Gateway Protocol (IGP).

In certain implementations, generating the unique SID may include executing a hashing function. For example, the hashing function may receive as input, the RID IP address.

Analyzing the subset of IP addresses to identify which IP addresses correspond to RID IP addresses may occur in several ways. For example, in one implementation, a mask length of each IP address may be checked to see if the mask length corresponds to a known mask length for RID IP addresses. In another implementation, each IP address may be checked to see if it lies within a range of known RID IP addresses. In still other implementations, the analysis may include determining a routing type supported by a device associated with each IP address or determining whether each IP address is associated with an IGP Type Length Value (TLV).

In another aspect of the present disclosure, another method of facilitating routing within a telecommunications network is provided. The method includes receiving, at a computing device communicatively coupled to the telecommunications network, network information including an Internet Protocol (IP) address for a first node of the telecommunications network. The computing device determines that the first node is not currently assigned a segment identifier (SID) for use in segment routing of packets to the first node from other nodes of the telecommunications network. In response, the computing device automatically generates a unique SID for the first node and announces, through a signaling protocol, the IP address with the unique SID of the first node to at least one second node of the telecommunications network.

In yet another aspect of the present disclosure, a system for operating a telecommunications network is provided. The system includes a computing device communicatively couplable to the telecommunications network. The computing device is configured to receive network information including an Internet Protocol (IP) address for a first node of the telecommunications network and to determine that the first node is not currently assigned a segment identifier (SID) for use in segment routing of packets to the first node from other nodes of the telecommunications network. The computing device is further configured to generate a unique SID for the first node based on the network information and to announce, through a signaling protocol, the IP address with the unique SID of the first node to at least one second node of the telecommunications network.

DETAILED DESCRIPTION

Figure 1:
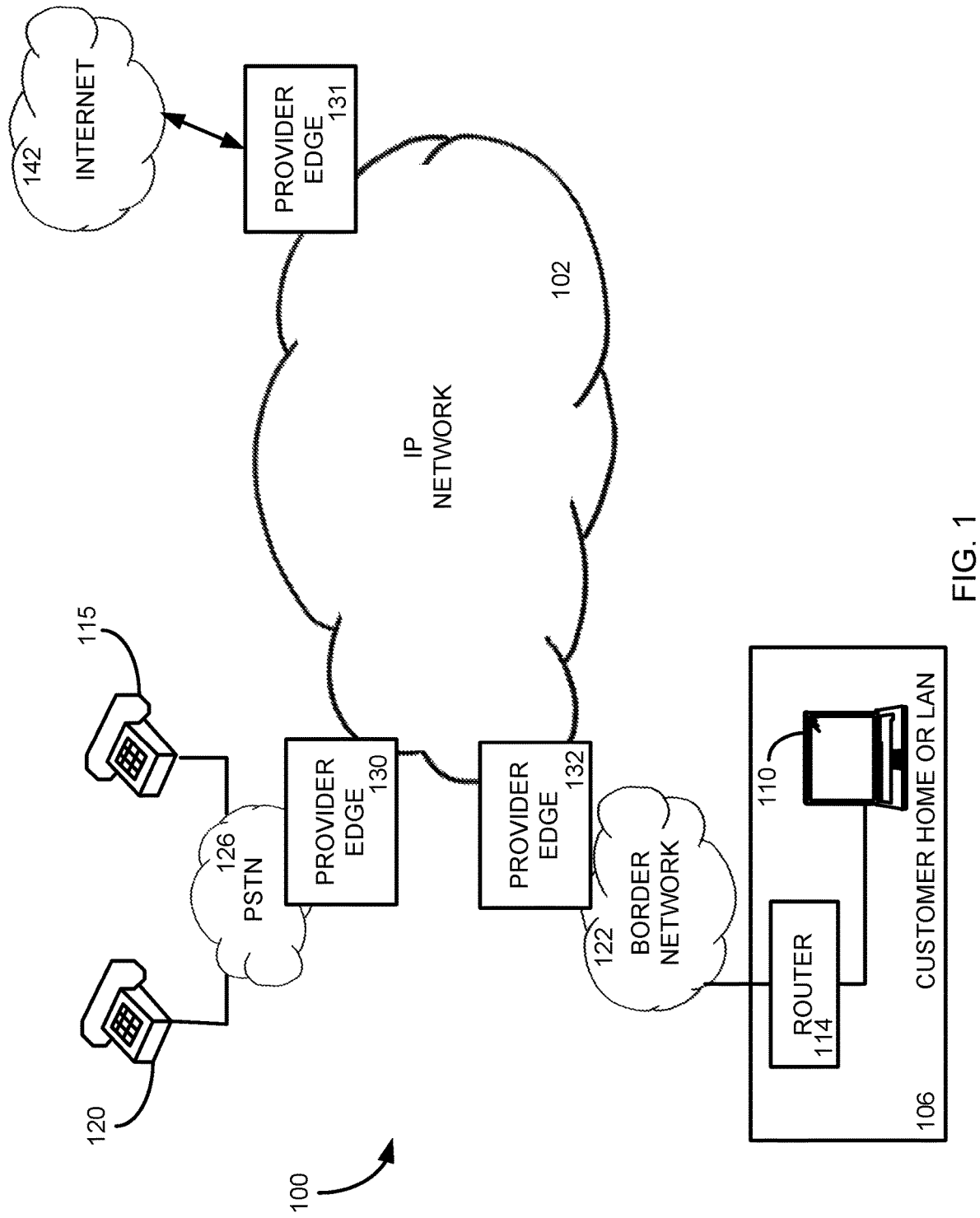
FIG. 1 schematic diagram illustrating an exemplary Voice over Internet Protocol (VoIP) operating environment in accordance with one embodiment.

One potential issue with segment routing in a Multiprotocol Label Switching (MPLS) network is that not every device within the network may support segment routing. As a result, not every node may be assigned a unique segment identifier (SID) or label and/or may not be able to announce such an identifier to other nodes in the network. In such instances, the network may include one or more segment routing mapping servers (SRMS). In general, a SRMS is a networking device that advertises to other nodes in the network static bindings of Internet Protocol (IP) addresses (which may be referred to as "prefixes") and globally unique SIDs. Thus, the SRMS may perform the announcing function for the nodes in the network that cannot advertise an SID. However, conventional SRMS devices require configuration during which each prefix-SID pairing for every non-segment routing device in the network is manually provided to the SRMS. While the manual configuration of an SRMS may be efficient in a small telecommunications network, large networks may require an administrator to enter and maintain several thousand prefix-SID mapping entries in the SRMS. Such maintenance of the mapping information in the SRMS is costly and time consuming.

In light of the foregoing, aspects of the present disclosure involve systems, methods, computer program products, and the like, for instantiating an SRMS in an MPLS network where the SRMS dynamically generates unique segment identifiers for nodes of the network for which a SID is unavailable. For purposes of the current disclosure, such an SRMS is referred to herein as a dynamic SRMS (DSRMS). In general, the DSRMS is a networking device that is a portion of a telecommunications network and receives routing and other network information from nodes of the network. Such information may include, among other things, Internal Gateway Protocol (IGP) routing information, advertised prefix values for the nodes, and label values used in MPLS routing. The DSRMS analyzes the information to identify nodes of the network that require but have not been assigned a SID for purposes of segment routing. In other words, the DSRMS analyzes the received network information to determine if IP addresses in the network information correspond to traffic handling components of the network (e.g., routers) for which SIDs are required. Such IP addresses are generally also referred to herein as router identifiers (RIDs). In one implementation, the DSRMS analyzes prefixes of the network information to determine if the prefix lies within a range of prefixes that are blocked as RIDs or otherwise known to be RIDs. The DSRMS may also analyze other information, such as an advertised mask length, IGP Type Length Value (TLV) information, types of routing protocols, and the like to determine which of the prefixes in the received network information indicate an RID. In general, any received network information may be analyzed to identify RIDs for nodes in the network. Although various aspects of the present disclosure may be deployed in a DSRMS, it is possible to implement various aspects in any device that obtains or otherwise has access to the proper network information and can communicate with the various nodes, directly or indirectly.

Once potential RIDs are identified, the DSRMS may auto-generate a unique SID for the identified RIDs. In one implementation, the DSRMS may compute an SID value based on the received RID. In general, any computation for generating a unique SID, such as a hashing function utilizing the RID as input, may be utilized by the DSRMS. Further, in some implementations, the generated SID may be compared to other SIDs utilized in the network to ensure that a SID is not used elsewhere within the network or has otherwise been reserved for other purposes. Once the unique SID is generated, the DSRMS may advertise a SID-prefix mapping including each of the unique SIDs and the associated prefix to other nodes of the network. Following such announcement, the other nodes within the network may include the SID within header information of a given packet to route the packet to the node associated with the prefix using conventional segment routing practices. Notably, the same computation (e.g. the same hash function) for generating the unique SID may be executed by other DSRMS instances within the network to ensure uniformity of SID-prefix pairs across the network. In this manner, the DSRMS may automatically generate SID-prefix mappings or pairs for a network, thereby removing the need for manual maintenance required for conventional SRMS systems.

Beginning in FIG. 1, a typical telecommunications network configuration is shown. In particular, FIG. 1 is a schematic diagram illustrating an exemplary Voice over Internet Protocol (VoIP) operating environment 100 in accordance with one embodiment. In general, the environment 100 provides for establishing communication sessions between network users and for providing one or more network services to network users. With specific reference to FIG. 1, the environment 100 includes a VoIP network 102, which may be provided by a wholesale network service provider. However, while the environment 100 of FIG. 1 shows a configuration using the VoIP network 102; it should be appreciated that portions of the network may include non IP-based routing. For example, network 102 may include devices utilizing time division multiplexing (TDM) or plain old telephone service (POTS) switching. In general, the network 102 of FIG. 1 may include any communication network devices known or hereafter developed.

The VoIP network 102 includes numerous components such as, but not limited to gateways, routers, and registrars, which enable communication and/or provides services across the VoIP network 102, but are not shown or described in detail here because those skilled in the art will readily understand these components. More relevant to this description is the interaction and communication between the VoIP network 102 and other entities, such as the one or more customer home or business local area networks (LANs) 106, where a user of the network will connect with the network.

Customer network 106 can include communication devices such as, but not limited to, a personal computer or a telephone 110 connected to a router/firewall 114. Although shown in FIG. 1 as computer 110, the communication devices may include any type of communication device that receives a multimedia signal, such as an audio, video or web-based signal, and presents that signal for use by a user of the communication device. The communication and networking components of the customer network 106 enable a user at the customer network 106 to communicate via the VoIP network 102 to other communication devices, such as another customer network 126 and/or the Internet 142. Components of the customer network 106 are typically home- or business-based, but they can be relocated and may be designed for easy portability. For example, the communication device 110 may be wireless (e.g., cellular) telephone, smart phone, tablet or portable laptop computer. In some embodiments, multiple communication devices in diverse locations that are owned or operated by a particular entity or customer may be connected through the VoIP network 102.

The customer network 106 typically connects to the VoIP network 102 via a border network 122, such as one provided by an Internet Service Provider (ISP). The border network 122 is typically provided and maintained by a business or organization such as a local telephone company or cable company. The border network 122 may provide network/communication-related services to their customers. In contrast, the communication device 120 accesses, and is accessed by, the VoIP network 102 via a public switched telephone network (PSTN) 126 operated by a local exchange carrier (LEC). Communication via any of the networks can be wired, wireless, or any combination thereof. Additionally, the border network 122 and PSTN 126 may communicate, in some embodiments, with the VoIP Network 102 through a provider edge 130,132. For ease of instruction, only three communication devices 110, 115, 120 are shown communicating with the VoIP network 102; however, numerous such devices, and other devices, may be connected with the network, which is equipped to handle enormous numbers of simultaneous calls and/or other IP-based communications.

An operator of the VoIP network 102 may configure the network in any manner to facilitate the routing of communications through the network. For example, the network 102 may include a series of interconnected networking devices, such as routers and switches, that receive a communication, analyze the communication to determine a destination, and route the communication to a connected networking device to get the communication closer to a destination or egress point (such as provider edge 131). To determine which routes through the network to utilize to route a received communication or packet, components of the network may receive route information through one or more route announcing sessions between the devices. These route announcing sessions provide Layer 3 routing information between the components of the network and between different networks so that components of the telecommunications network 102 and other networks may determine how to route received communication packets.

One particular example of the announcement of Layer 3 routing information occurs in a Border Gateway Protocol (BGP) announcement. In general, BGP information (or BGP session, BGP feed or BGP data) is a table of Internet Protocol (IP) prefixes which designate network connectivity between autonomous systems (AS) or separate networks. BGP information for a network route may include path (including next-hop information), network policies, and/or rule-sets for transmission along the path, among other information. The BGP feed may also include Interior Gateway Protocol (IGP) information for network routes within an Autonomous System (AS) or network and/or other network information that pertains to the transmission of content from the network. However, BGP information mainly describes routes used by the network 102 to connect to external networks or customers (such as border network 122 and virtual cloud environment 142) while IGP information describes routes through the network to connect one provider edge (such as provider edge 132) to another provider edge (such as provider edge 131) through a telecommunications network 102.

The VoIP network 102 is provided as an example to illustrate various aspects of telecommunications relevant to the present disclosure. Implementations of the present disclosure are not limited to VoIP networks or networks for supporting VoIP functionality. Rather, the concepts discussed herein are more generally applicable to exchanging and routing data through a telecommunications network between endpoints of the telecommunications network.

Figure 2:
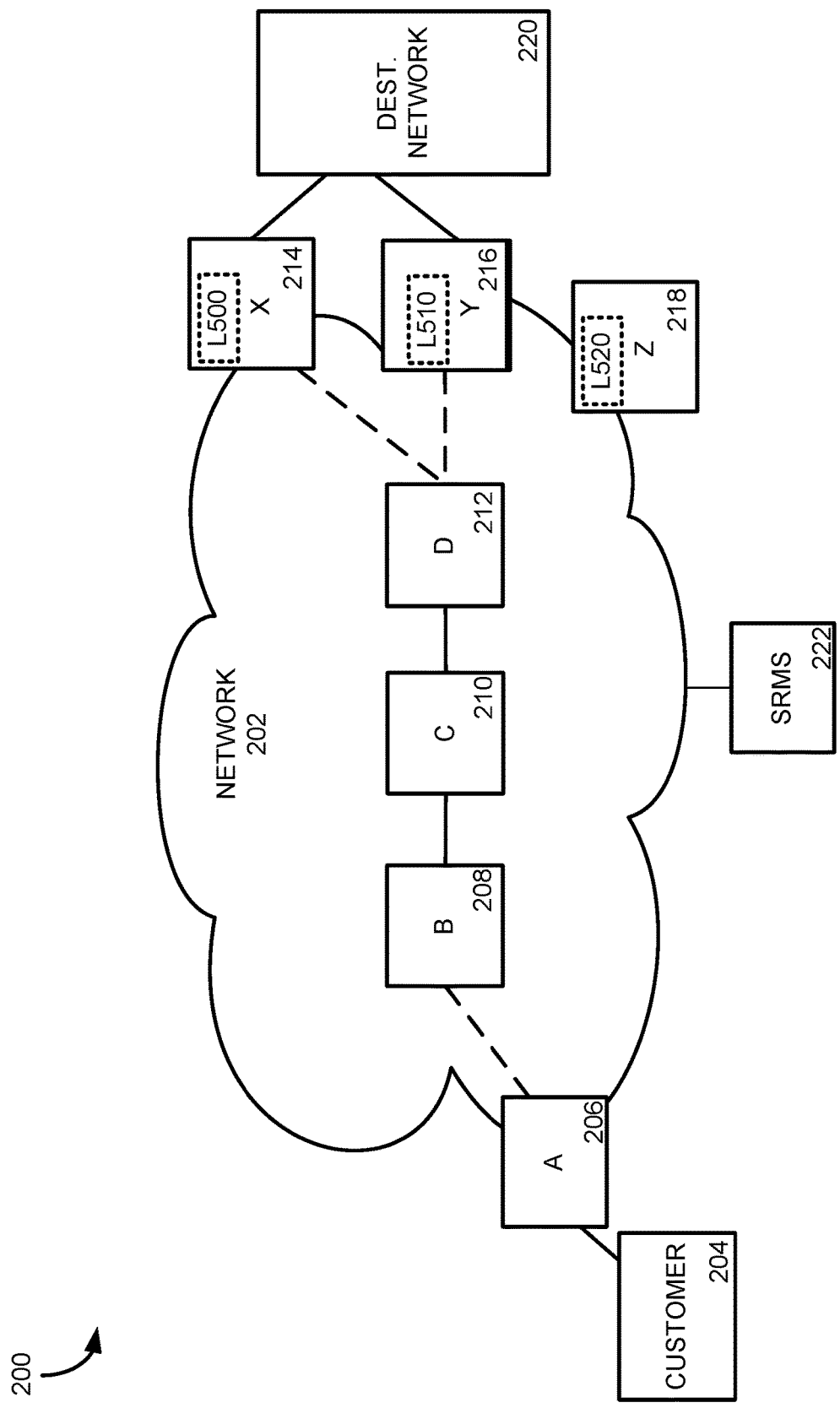
FIG. 2 is a schematic diagram illustrating an exemplary network environment utilizing a segment routing mapping server for Multiprotocol Label Switching (MPLS) within the network.

In one instance, the telecommunications network 102 may utilize MPLS routing through the network. FIG. 2 is a schematic diagram illustrating an exemplary network environment 200 utilizing a Segment Routing Mapping Server (SRMS) 222 for MPLS routing within the network 202. The network environment 200 includes a telecommunications network 202 similar to that described above with reference to FIG. 1. Further, a customer network or device 204 may connect to the network 202 for providing communication packets to the network for delivery to a destination network or device 220. As described above, the customer device 204 provides packets to the network 202 through an edge device, such as ingress edge device A 206. The packet includes destination information, such as an IP address for the destination network or device 220. Through routing information propagated through the network in BGP and IGP announcements, edge device A 206 determines that destination network 220 may be reached through egress edge device X 214 or egress edge device Y 216. Edge device A 206 may also determine a shortest routing path through the network 202 to reach a selected one of the egress edge devices 214, 216 and ultimately to the destination network 220. In this embodiment, the route through the network 202 includes network device B 208, network device C 210, and network device D 212. These devices (edge device A 206 through edge device X 214 or edge device Y 216) may define a Label-Switched Path (LSP) through the network 202. It should be appreciated, however, that any number and/or types of network devices may be included in the LSP through the network 202 and the configuration illustrated in FIG. 2 is merely an example configuration.

In MPLS networks that utilize segment routing, the nodes or components of the network may be assigned or announce a unique label used for routing to that particular node. For example, edge device X 214 may announce a unique label "500", edge device Y 216 may announce a unique label "510", and edge device Z 218 may announce a unique label "520". Other devices within the network 202 may also announce a unique label for segment routing. More particularly, the unique label (also referred to as a Segment Identifier or "SID") is paired with a router identifier (RID) that takes the form of an IP address (or "prefix") for that particular device. Each SID is uniquely assigned to a prefix such that other nodes within the network 202 may utilize the announced SID for route communication packets along the LSP to the node associated with the particular prefix. More specifically, following announcement, a packet may be routed to a node associated with a given prefix by including the corresponding SID of the prefix in a header of the packet. The packet is then routed through the network, such as by shortest path routing, equal cost multipath (ECMP) routing, or any other routing technique, to reach the prefix.

For example, edge device A 206 may select edge device X 214 for providing a received packet to the destination network 220. To route the packet, edge device A 206 applies label value "500" to the packet header and transmits the packet to device B 208. Device B 208 reads the label and, knowing that the packet is intended for edge device X 214 by the inclusion of the label value for edge device X 214, routes the packet down the LSP, eventually reaching edge device X 214. As the packet is routed to edge device X 214, the label value "500" is retained such that intermediate devices between device B 208 and edge device X 214 similarly know to route the packet to edge device X 214. When edge device X 214 receives the packet, edge device X 214 removes the label value from the packet and utilizes the destination IP address of the packet to transmit the packet to the destination network 220. Although the foregoing example specifically used edge device X 214 as a destination prefix, it should be appreciated that the label value inserted into the header of the packet may also correspond to any node/prefix within the network 202.

In some network instances, devices within the network may not support segment routing and, as a result, may not be assigned a SID or otherwise support SID announcements for purposes of facilitating segment routing. For example, network devices configured with legacy label advertisement protocols (such as Label Distribution Protocol (LDP)) may not support unique SID announcements. To address this issue, the network 202 may include one or more Segment Routing Mapping Servers (SRMS) 222 that act as a proxy server for such devices and that advertise unique SID labels on behalf of the devices. For example, assume that edge device Z 218 does not support segment routing protocols for the SID label "520" assigned to the device. Rather, SRMS 222 may announce the SID-prefix pair for edge device Z 520 to the nodes of the network 202 for use in label routing packets to edge device Z 520. Nodes within the network 202 may then utilize the SID for edge device Z 520 for routing within the MPLS.

Conventionally, an SRMS may be manually populated and maintained by an administrator or operator of a network. Thus, a technician or other network administrator must log into the SRMS and provide the SID-prefix pairs for the network such that each node may utilize the proper SID for label routing of a packet. However, in large networks, this process may be time-consuming for the technician. Further, as networks evolve and grow over time, the opportunity for a mistake in maintaining the table of SID-prefix pairs increases, creating the potential for routing issues within the network resulting in lost or dropped packets.

To improve the efficiency and stability of the network 202, a Dynamic SRMS (DSRMS) device 222 is described herein. In general, the DSRMS 222 identifies which nodes within a network require but have not been assigned a SID and then automatically generates and announces unique SIDs for such nodes. The network information provided to the DSRMS 222 may include, among other things, information received at the DSRMS 222 from nodes of the network through IGP and BGP announcements. Accordingly, the DSRMS 222 removes the need for a network technician to manually maintain the SID-prefix table. By doing so, the DSRMS 222 reduces the potential for errors in the SID-prefix table. In certain implementations, the DSRMS 222 utilizes an function, such as a hashing function that uses a portion of the network information as an input, to generate the unique SIDs. The DSRMS 222 may further conduct various checks to ensure that any generated SID is not utilized elsewhere within the network 202 or otherwise reserved. The function for generating the SID may be repeatable in that it generates the same SID when provided the same input values. As a result, several DSRMS 222 devices may be implemented within the network 202 to allow the MPLS network to scale or expand as needed without having to regenerate or configure the SID-prefix table of the newly added or currently used DSRMS devices.

Figure 3:
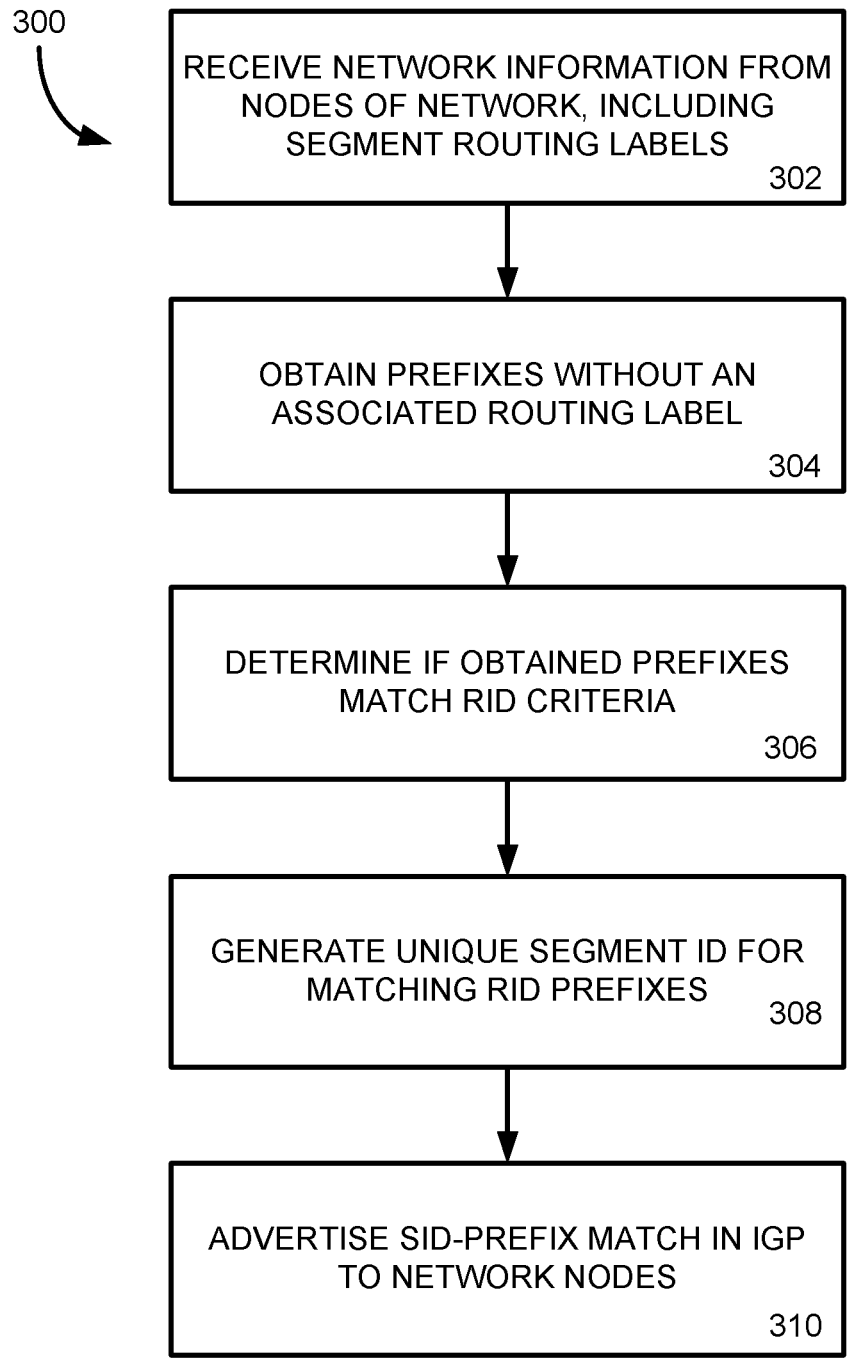
FIG. 3 is a flowchart of a method for utilizing a dynamic segment routing mapping server in a MPLS network to generate unique segment identifiers for nodes of the network.

FIG. 3 is a flowchart of a method 300 for utilizing the DSRMS 222 of the network 202 to generate unique SIDs for nodes of the network 202. The operations of the method 300 may thus be performed by a networking device configured as a DSRMS. In one implementation, the DSRMS 222 is an application server or other networking device executing one or more applications that perform the operations described herein. Further, although illustrated in the network environment 200 of FIG. 2 as being a single component of the network 202, it should be appreciated that portions of the DSRMS 222 may be included in any number of devices of the network to perform any number of the operations of the method 300.

Beginning in operation 302, the DSRMS 222 receives IGP or other network information from the nodes or devices of the network 202. In some implementations, the DSRMS 222 receives IGP information transmitted through the network 202 that includes prefixes corresponding to various components of the network. For components that support segment routing, the network information may further include an SID or label value corresponding to such network components that may be used to label route a packet to the component or node. Prefixes or IP addresses that identify the components of the network 202 may also be referred to as router identifiers (RIDs). Thus, through the network information, the DSRMS 222 may determine which nodes of the MPLS network 202 are associated with an SID-prefix pair and include those received pairs into a table of mapped SID-prefix pairs.

In addition to receiving matched SID-prefix pairs as part of the network information, the DSRMS 222 may receive prefixes that do not have a corresponding SID. For example, one or more IP addresses in the network information may not identify a node but may rather be IP addresses for specific ports of devices or virtual components of the network 202. In addition, some components may not support segment routing such that IP addresses or prefixes may be announced without a corresponding SID. Thus, in operation 304, the DSRMS 222 may obtain prefixes of nodes or components of the network 202 that do not have a corresponding SID and retain those prefixes as potential RIDs of those nodes or components. These prefixes may then be analyzed as described below to determine if a unique SID should be automatically generated for them by the DSRMS 222.

To begin generating unique SID-prefix pairs for non-paired nodes of the network 202, the DSRMS 222 determines which of the received prefixes or IP addresses are potential RIDs in operation 306. To determine which prefixes are RIDs, the DSRMS 222 analyzes the prefixes received in the network information to identify which prefixes have characteristics indicating that they are RIDs. For example, the network 202 may have blocks of prefixes reserved for use as RIDs such that the DSRMS 222 may determine that a received prefix is an RID if the received prefixed falls within the range of prefixes of the reserved block. In another implementation, the DSRMS 222 may identify RIDs based on a mask length of the received prefix. For example, an IP version 4 (IPv4)-type RID typically has a mask length of /32 while an IP version 6 (IPv6)-type RID typically has a mask lengths of /126. Thus, the DSRMS 222 may analyze the received prefixes to determine a mask length of the prefixes and identify those prefixes that have a mask length that suggests an RID prefix. In general, any aspect of a received prefix may be analyzed by the DSRMS 222 to determine whether the received prefix is a RID.

With the RIDs identified from the received network information, the DSRMS 222 generates a unique SID for each of the identified RIDs in operation 308. In one particular implementation, the DSRMS 222 utilizes a hashing function to generate a unique SID from a corresponding RID. In general, however, any function to generate a unique SID for a corresponding RID may be utilized by the DSRMS 222. In certain implementations, the function may be repeatable in that the function will always produce the same SID given a particular set of inputs. In such cases, multiple instances of the DSRMS 222 may be included in the network, each of which may be configured to generate the same SID for a given potential RID prefix. Thus, utilizing a repeatable hashing function from the potential RID prefix in the multiple DSRMS 222 of the network 202 may ensure that the SID generated for a particular RID prefix is unique to that prefix through the entirety of the MPLS network 202.

In operation 310, each instance of the DSRMS 222 of the network 202 may advertise all SID-prefix pairs known by the DSRMS 222, including the automatically generated SID-prefix pairs and the SID-prefix pairs received through the network information. In some implementations, the SID-prefix pairs may be announced through one or more IGP sessions with components or nodes of the network 202, although any known or hereafter developed signaling protocol may be utilized by the DSRMS 222 of the network 202 to broadcast the generated and known SID-prefix pairs. In this manner, the DSRMS 222 may perform the traditional functions of the SRMS while also automatically identifying potential RIDs within the network and generating unique SIDs for nodes in the network 202 that do not already have an associated unique SID. Through this auto-generation of the SIDs, the operation and maintenance of the network 202 may be improved and become more efficient.

Figure 4:
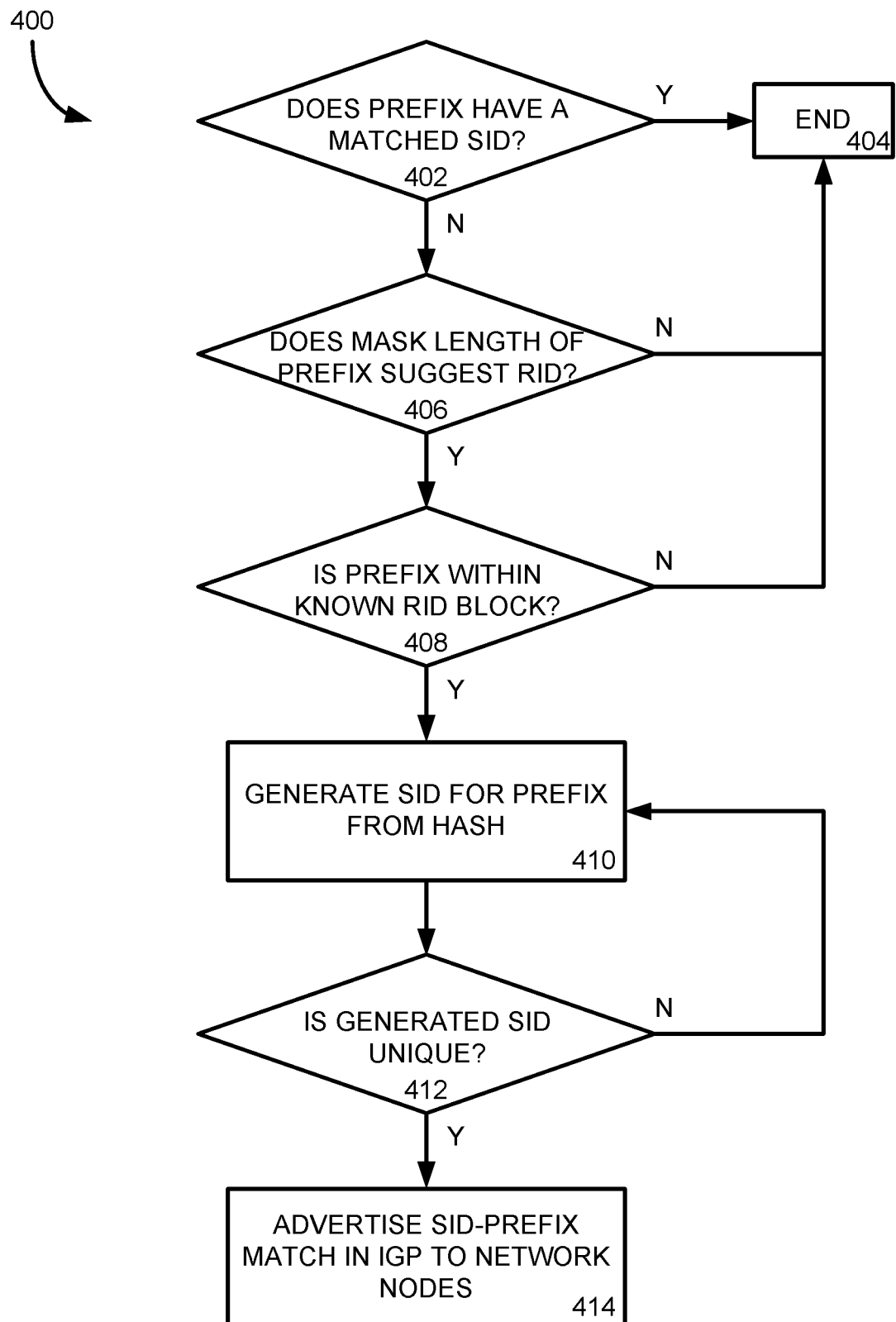
FIG. 4 is a flowchart of a method for identifying nodes in a MPLS network that do not have a paired segment identifier and for generating a unique segment identifier for the identified nodes for use in labeled routing.

FIG. 4 is a flowchart of a method 400 for identifying nodes in a MPLS network 202 that do not have a SID-prefix pair and for generating a unique SID for the identified nodes for use in labeled routing. Similar to the method 300 described above, operations of the method 400 of FIG. 4 may be performed by a networking device configured as a DSRMS 222. In this method, the operations of identifying potential RIDs from the received prefixes in the IGP or other network information are described in more detail. The operations of generating a unique SID for potential RIDs are also further described below. The method 400 of FIG. 4 may be performed by the DSRMS 222 after the network information (such as node prefixes, port prefixes, and other connectivity information) and the label routing information (such as known SID-prefix pairs and other label routing values) have been received at the DSRMS 222. Further, it should be appreciated that the method 400 of FIG. 4 is but one example of operations performed by the DSRMS 222 to automatically generate an SID for a received prefix. Other operations and other ordering of the operations may also be executed by the DSRMS 222 to generate unique SIDs for prefixes of the MPLS network 202.

Beginning in operation 402, the DSRMS 222 determines if a received prefix from the network information has a mapped or correlated SID associated with the prefix. As described above, some nodes or components of the network 202 may have a unique SID associated with the component for segment routing of packets to the particular node. Other components, however, may not announce such SID-prefix pairs but may instead simply announce one or more prefixes associated with the node. Thus, the DSRMS 222 obtains a received prefix from the network information and determines if the prefix has a paired SID value. If the prefix has a paired SID value, an SID need not be generated for the particular prefix and the method ends at operation 404. However, if the particular prefix has no paired SID, the DSRMS 222 may continue to operation 406.

In operation 406, the DSRMS 222 obtains a mask length of the prefix and determines if the mask length suggests that the prefix is a potential RID. As mentioned above, a potential RID may, for example, include a mask length of /32 for IPv4 packets and /126 for IPv6 packets. Through the mask length, the DSRMS 222 may determine that a given prefix is likely a RID. If the particular prefix has a mask length that does not match the typical RID mask length, the DSRMS 222 may disregard the prefix as not being an RID and continue on to operation 404 and end the inquiry into the particular prefix. However, if the prefix has a mask length that is a known RID mask length, the DSRMS 222 may continue to operation 408 to determine if the prefix is within a known block of RIDs. As explained above, some MPLS networks 202 may reserve blocks or ranges of prefixes for RIDs of components of the network. Analysis of the received prefix may determine if the prefix is within the range of known RIDs. If the particular prefix is outside the known range of RIDs, the DSRMS 222 proceeds to operation 404 and assumes the prefix is not an RID. However, if the prefix is within the known RID block, the DSRMS 222 may determine the prefix is a RID and may then generate a unique SID number or value for the prefix.

As should be appreciated, the operations to identify potential RIDs may be as inclusive as desired by a network administrator. Thus, some networks or DSRMS may be more inclusive in identifying potential RIDs to ensure that all RIDs of the network are assigned a unique SID. In general, there is little additional cost to assigning a unique SID to prefixes that are not RIDs as those SIDs are simply unused by the network during label routing. In other instances, however, the network or DSRMS may be less inclusive and only generate unique SID values to prefixes that meet specific prefix criteria. In this manner, the identification of potential RID prefixes within the network may be tuned to the desires and needs of a network administrator.

In operation 410, the DSRMS 222 generates a unique SID for the potential RIDs identified in the above operations. In general, the DSRMS 222 may utilize any suitable function to generate the unique SIDs for the potential RIDs. In one particular example, the DSRMS 222 utilizes a hashing function that converts each potential RID into a unique SID value. Typically, the function is repeatable such that the same unique SID may be generated at multiple DSRMS devices within the network 202 to avoid SID duplication. Although any hashing function may be utilized, one particular function may take the following form. First, the DSRMS 222 may calculate log 2 of the pool size (P) of identified potential RIDs and round up to the nearest integer value (B). Next, the rightmost B bits of the particular potential RID are calculated for value N. Third, N mod P is used as the index for a hashing function to create a potential unique SID for the particular potential RID. Again, this function is but one example of potential functions that may be utilized by the DSRMS 222 to generate a unique SID value for a given potential RID. Further, the hashing function may be performed by any number of DSRMS 222 of the network 202 that each return the same unique SID value for the given potential RID.

In operation 412, the DSRMS 222 may compare the generated potential unique SID for the particular RID to other received SID values from the network. In other words, the DSRMS 222 may determine if the generated SID is already assigned to a node of the network 202 and, thus, is not unique to the potential RID. If the generated SID is already assigned to a node, the DSRMS 222 may return to operation 410 and generate a new SID for the identified RID. In one example, the DSRMS 222 may simply increment or decrement the generated SID and continue comparing the incremented or decremented value to known SID values until a unique value is found. Other functions may also be used to generate other potential SIDs for a given potential RID. Once a unique SID value for the network 202 is found, the DSRMS 222 may continue to operation 414 and advertise the generated SID as paired with the RID to the nodes or components of the network 202. In this manner, the DSRMS 222 may generate a unique SID for prefixes received at the DSRMS and announce a paired SID-prefix to the nodes of the network 202 without an administrator configuring the DSRMS manually.

Through the systems and methods described above, a DSRMS may be included in a MPLS network that generates unique segment identifiers for nodes of the network without a previously associated mapped label value. In general, the DSRMS receives routing information from the nodes of the network and analyzes the information to identify RID prefixes that may not have an assigned SID. In general, any received network information may be analyzed to identify RIDs for nodes in the network. Once potential RIDs are identified, the DSRMS may auto-generate a unique SID for the identified prefixes. In one implementation, the DSRMS may utilize a function to generate an SID value based on the received prefix, although any function for generating a unique SID. Once the unique SID-prefix matching is generated, the DSRMS may advertise the mapping to the nodes of the network for use in MPLS routing of communication packets to devices that do not typically support segment routing.

Figure 5:
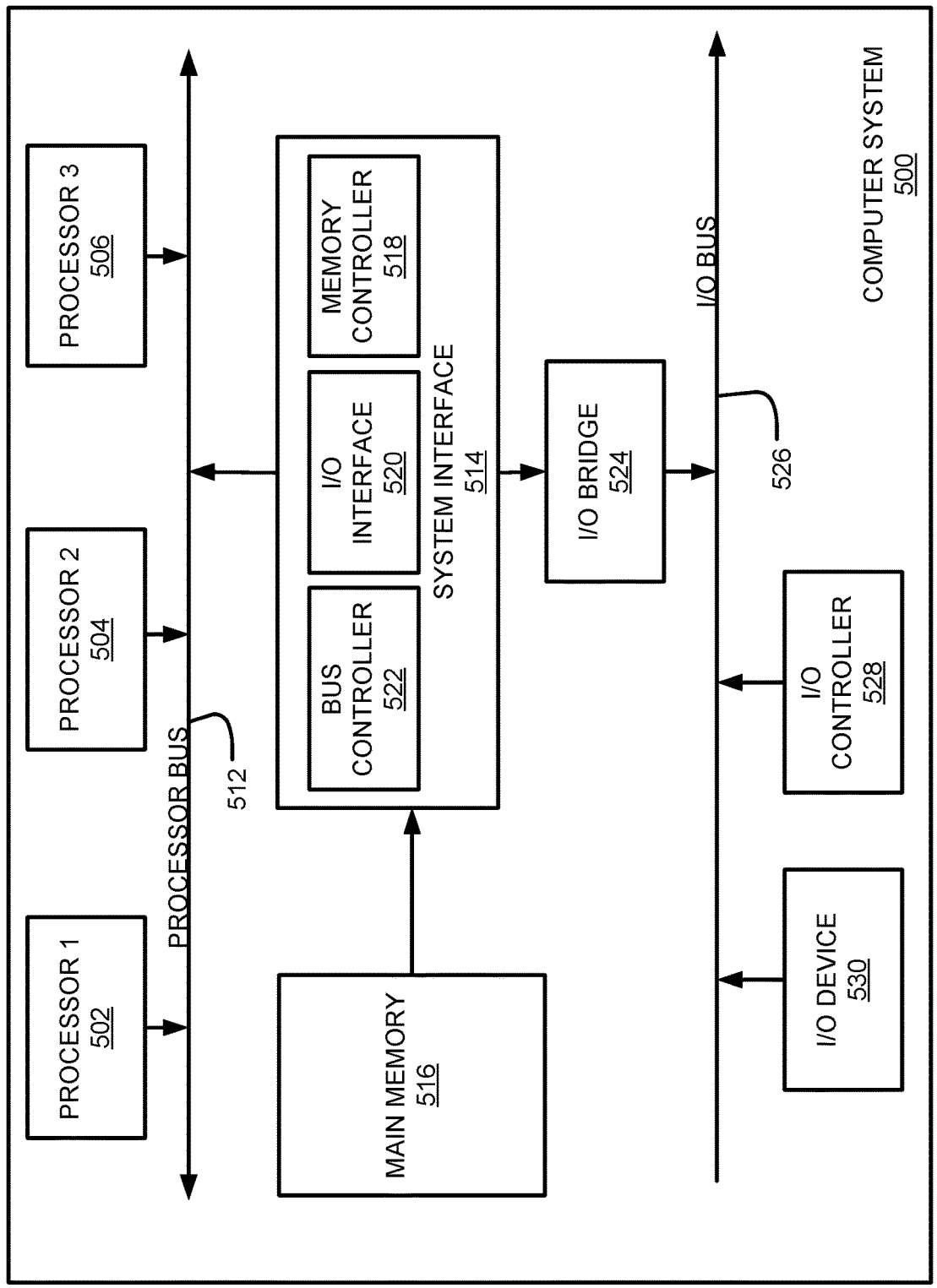
FIG. 5 is a diagram illustrating an example of a computing system which may be used in implementing embodiments of the present disclosure.

FIG. 5 is a block diagram illustrating an example of a computing device or computer system 500 which may be used in implementing the embodiments of the components of the network disclosed above. For example, the computing system 500 of FIG. 5 may be the virtual router of the bridge discussed above. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 518 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 530, as illustrated. The system interface 514 may further include a bus controller 522 to interact with processor bus 512 and/or I/O bus 526.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages should be understood by the foregoing description, and it should be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

I claim:

1. A network routing method comprising:
   receiving a plurality of Internet Protocol (IP) addresses from a plurality of components of a Multiprotocol Label Switching (MPLS) network, at least one IP address of the plurality of IP addresses being unmapped to a segment identifier (SID) for routing communication packets in the MPLS network;
   analyzing the at least one IP address to identify a router identifier (RID) IP address, the RID IP address corresponding to a node of the MPLS network included in a Label-Switched Path (LSP) of the MPLS network, wherein analyzing the at least one IP address to identify the RID IP address comprises at least one of:
      comparing a mask length of each of the plurality of IP addresses to a known mask length of RID IP addresses; or
      comparing each of the plurality of IP addresses to a known range of RID IP addresses;
   generating a unique SID for the RID IP address; and
   announcing, through a signaling protocol, the unique SID and the RID IP address as a matched pair for segment routing in the MPLS network,
   wherein the unique SID is generated if the mask length is equal to the known mask length or if the IP address is within the known range of RID IP addresses, respectively.

2. The method of claim 1, wherein generating the unique SID for the RID IP address comprises executing a hashing function and the RID IP address is an input to the hashing function.

3. The method of claim 1, wherein the signaling protocol for announcing the unique SID and the RID IP address is an Interior Gateway Protocol (IGP).

4. The method of claim 1, further comprising updating a table of SID-IP address pairs of the telecommunications network maintained at the computing device to include the unique SID and RID IP address, wherein the unique SID and the RID IP address are announced by announcing SID-IP address pairs stored in the table.

5. A system for facilitating routing within a telecommunications network, the system comprising:
   a computing device communicatively couplable to the telecommunications network, the computing device configured to:
      receive a plurality of Internet Protocol (IP) addresses from a plurality of components of a Multiprotocol Label Switching (MPLS) network, at least one IP address of the plurality of IP addresses being unmapped to a segment identifier (SID) for routing communication packets in the MPLS network;
      analyze the at least one IP address to identify a router identifier (RID) IP address, the RID IP address corresponding to a node of the MPLS network included in a Label-Switched Path (LSP) of the MPLS network, wherein analyzing the at least one IP address to identify the RID IP address comprises at least one of:
         comparing a mask length of each of the plurality of IP addresses to a known mask length of RID IP addresses; or
         comparing each of the plurality of IP addresses to a known range of RID IP addresses;
      generate a unique SID for the RID IP address; and
      announce, through a signaling protocol, the unique SID and the RID IP address as a matched pair for segment routing in the MPLS network,
   wherein the unique SID is generated if the mask length is equal to the known mask length or if the IP address is within the known range of RID IP addresses, respectively.

6. The system of claim 5, wherein generating the unique SID for the RID IP address comprises executing a hashing function and the RID IP address is an input to the hashing function.

7. The system of claim 5, wherein the signaling protocol for announcing the unique SID and the RID IP address is an Interior Gateway Protocol (IGP).

8. The system of claim 5, wherein the computing device is further configured to update a table of SID-IP address pairs of the telecommunications network maintained at the computing device to include the unique SID and RID IP address, wherein the unique SID and the RID IP address are announced by announcing SID-IP address pairs stored in the table.

* * * * *